United States Patent
Ramsey et al.

(10) Patent No.: US 7,449,106 B2
(45) Date of Patent: Nov. 11, 2008

(54) SUCTION-DRIVEN FLUID FILTRATION SYSTEM FOR RECREATIONAL OR EMERGENCY USE

(76) Inventors: Philip W. Ramsey, 645 Plymouth St., Missoula, MT (US) 59801; James E. Gannon, 524 S. 6th St. East, Missoula, MT (US) 59801; A. Wharton Ramsey, 3055 Poplar St., Roanoke, VA (US) 24014

( * ) Notice: Subject to any disclaimer, the term of this patent is extended or adjusted under 35 U.S.C. 154(b) by 456 days.

(21) Appl. No.: 11/260,345

(22) Filed: Oct. 27, 2005

(65) Prior Publication Data
US 2007/0095740 A1 May 3, 2007

(51) Int. Cl.
*B01D 35/153* (2006.01)
(52) U.S. Cl. .............. 210/117; 210/136; 210/439; 210/440

(58) Field of Classification Search .......... 210/116, 210/136, 282, 287–289, 416.3, 438–440, 210/452, 117, 172.1, 418, 443, 444
See application file for complete search history.

(56) References Cited

U.S. PATENT DOCUMENTS

| 966,963 | A | * | 8/1910 | Steinkoenig | 210/439 |
| 4,152,262 | A | * | 5/1979 | Rose | 210/136 |

FOREIGN PATENT DOCUMENTS

| JP | 03026309 | A | * | 2/1991 | 210/288 |

* cited by examiner

*Primary Examiner*—Matthew O Savage
(74) *Attorney, Agent, or Firm*—Peter J. Van Bergen

(57) ABSTRACT

A fluid filtration system housing has first, second and third openings. A cap is removably and sealably attached to the first opening. A filter assembly is fitted in the housing to thereby define a first chamber accessible via the third opening and a second chamber accessible via the second opening and sealed by the cap.

19 Claims, 4 Drawing Sheets

SUCTION-DRIVEN FLUID FILTRATION SYSTEM FOR RECREATIONAL OR EMERGENCY USE

FIELD OF THE INVENTION

The invention relates generally to fluid filtration systems, and more particularly to a fluid filtration system that provides filtered fluids such as water for recreational or emergency purposes when the only fluids available are unpotable and/or distasteful.

BACKGROUND OF THE INVENTION

Today's recreational sports include a wide variety of activities (e.g., hiking, rock climbing, mountaineering, mountain biking, canoeing, kayaking, fishing, hunting, white water rafting, etc.) that take place in remote unpopulated regions and/or in harsh environmental conditions. In these regions and/or conditions, it is important for individuals to keep their bodies properly hydrated. However, packing sufficient amounts of drinkable fluids for an entire activity may be difficult or impractical. Furthermore, poor planning or emergency situations can cause individuals to run out of drinkable fluids. Although there may be water available from a variety of nearby natural sources, such water is generally unpotable and/or distasteful, and could cause serious illness if consumed.

In an effort to provide a solution to this problem, a variety of water bottle or hydration systems have incorporated a purification filter to remove unwanted chemicals or organisms. That is, the unpotable and/or distasteful fluid is stored in a container with a filter being provided such that the fluid passes through the filter as it exits the container. However, this means that the container is contaminated by the unpotable and/or distasteful fluid. Thus, even after the unwanted fluid has been emptied from the container, there is a chance that residual contamination remains. Further, many current water container/filtration systems use a pump or gravity feed to get the unpotable and/or distasteful fluid through the system's filter. However, a pump's moving parts are always subject to failure and add extra weight. Gravity-feed systems can be slow. Still further, many current water container/filtration systems are designed for specific activities (e.g., on-land activities, on-water activities, etc.), but are not versatile enough to function in a variety of activities and/or environments.

SUMMARY OF THE INVENTION

Accordingly, it is an object of the present invention to provide a fluid filtration system.

Another object of the present invention is to provide a fluid filtration system that is adaptable for use in a variety of recreational activities and emergency situations.

Still another object of the present invention is to provide a fluid filtration system that can provide filtered fluid directly to a user or to a container.

Other objects and advantages of the present invention will become more obvious hereinafter in the specification and drawings.

In accordance with the present invention, a fluid filtration system includes a housing having first, second and third openings formed therein. A cap is removably and sealably attached to the first opening. A filter assembly is fitted in the housing and, in combination with the housing, defines a first chamber accessible via the third opening and a second chamber accessible via the second opening and sealed by the cap. When a fluid to be filtered is present at the third opening and suction is applied to the second opening, the fluid is (i) drawn into the first chamber, (ii) through the filter assembly, (iii) into the second chamber, and (iv) to the second opening. Tubes can be attached to the second third openings to facilitate fluid movement to and from the system.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
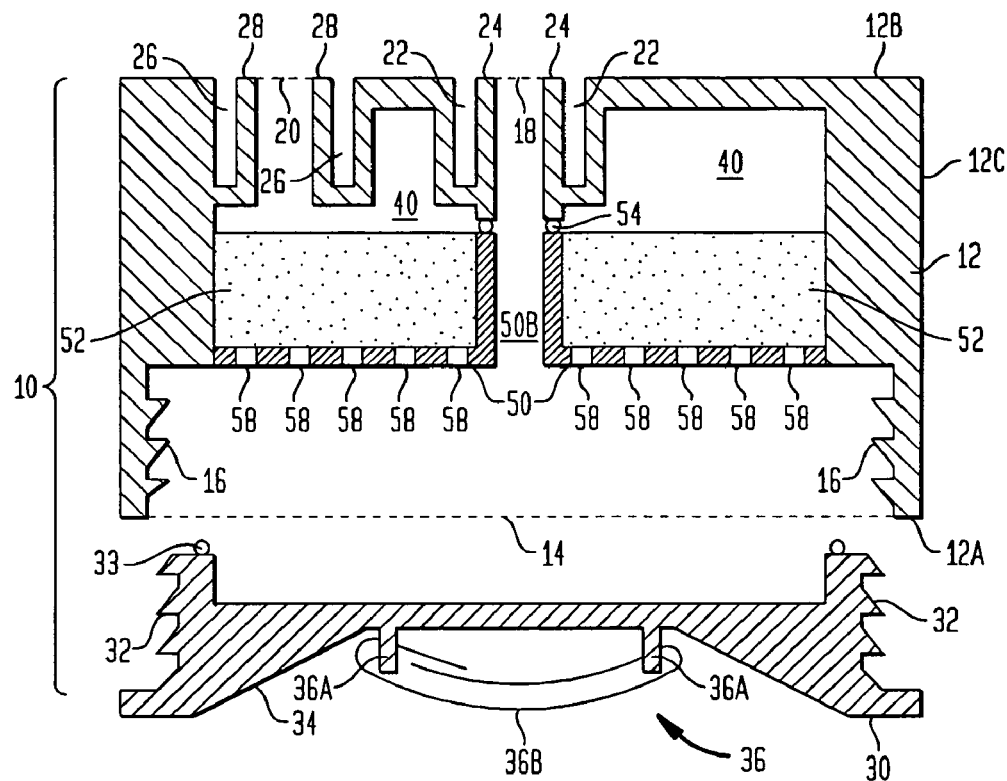
FIG. 1 is a cross-sectional view of a fluid filtration system in accordance with an embodiment of the present invention in which the cap is not attached to the housing.
Figure 2:
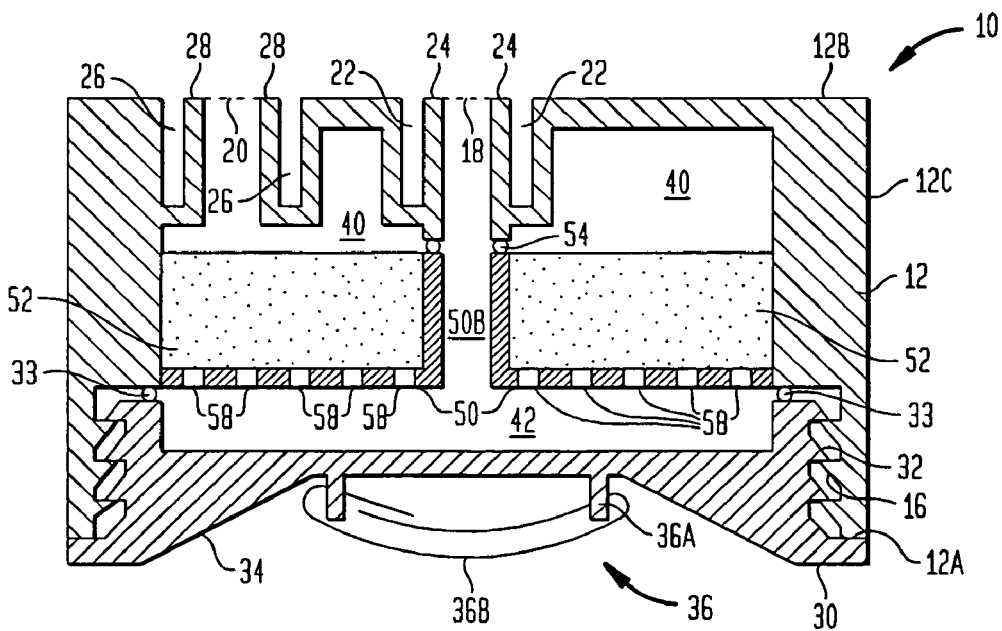
FIG. 2 is a cross-sectional view of the fluid filtration system with the cap attached to the housing.

Referring now to the drawings and more particularly to FIGS. 1 and 2, cross-sectional views of a fluid filtration system in accordance with the present invention are shown and are referenced generally by numeral 10. To more clearly show the invention's features, FIG. 1 illustrates system 10 in a partially assembled state and FIG. 2 illustrates system 10 in a fully assembled state. Fluid filtration system 10 will typically be used to filter unpotable water just prior to the drinking or storage thereof. Accordingly, the ensuing description will make references to using system 10 in this fashion. However, it is to be understood that fluid filtration system 10 can be used to filter any fluid without departing from the scope of the present invention.

System 10 has an outer shell or housing 12 made from a rigid material (e.g., plastic, metal, composite, etc.) that does not contaminate the fluid being processed through system 10. Housing 12 can be shaped in a variety of ways without limiting the scope of the present invention. By way of illustrative example, housing 12 can be cylindrical with opposing axial ends 12A and 12B, and a cylindrical sidewall 12C. Formed in axial end 12A is an opening 14 that (in the illustrated example) substantially spans the internal diameter of housing 12. Threads 16 are formed on the inside of sidewall 12C for threaded and sealing engagement with an end cap 30, the details of which will be explained further below.

Axial end 12B of housing 12 has two openings 18 and 20 formed therethrough. End 12B can further be shaped to define an annular recess 22 about opening 18 such that the combination thereof defines a rigid tubular section 24 of axial end 12B. Similarly, an annular recess 26 can be defined about opening 20 such that the combination thereof defines a rigid tubular section 28 of axial end 12B.

A filter assembly is mounted in housing 12 in a sealing manner so that two distinct chambers are defined within housing 12 when cap 30 is coupled to housing 12 (FIG. 2). The particular construction of the filter assembly as well as the filter material used thereby are not limitations of the present invention. However, by way of illustrative example, the filter assembly can have a frame 50 supporting any microbiological filter material 52. Examples of such filter materials include, but are not limited to, those that work by particle size exclusion (e.g., polymer or ceramic based filter materials), and charge or adsorption based filter materials using, for example, ion exchange or activated carbon. Further, the filter material can contain an antimicrobial agent (e.g., halogen, a heavy metal, an organic agent, a UV radiation element, etc.). Still further, a combination of filter materials can be used.

Figure 3:
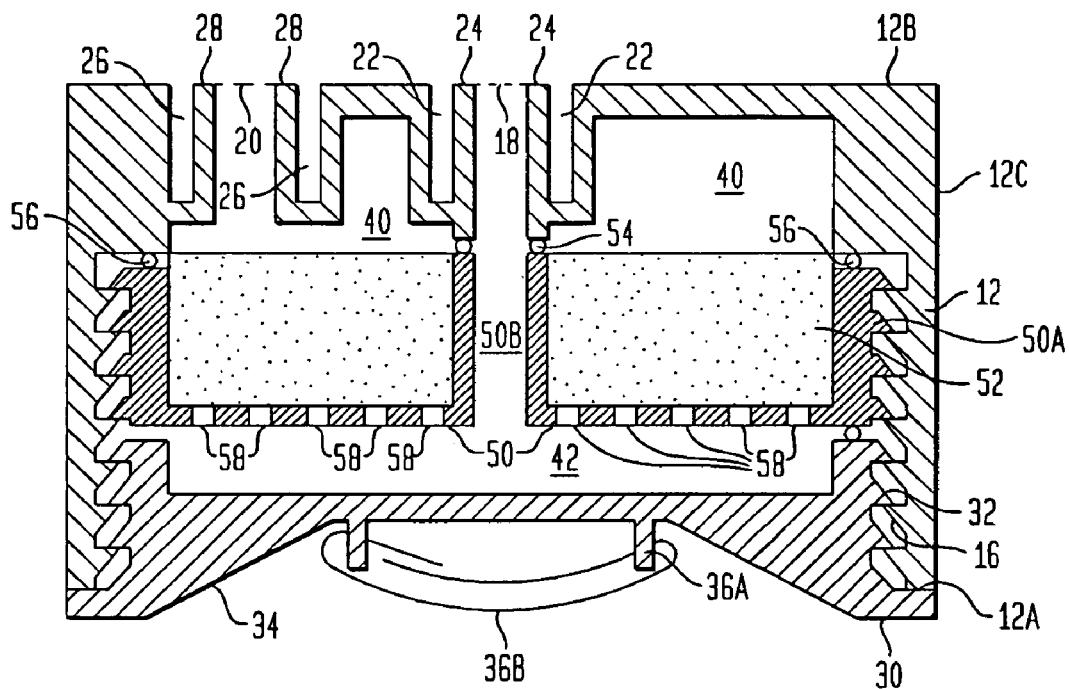
FIG. 3 is a cross-sectional view of a fluid filtration system in accordance with another embodiment of the present invention in which the filter is threaded into the housing.

The filter assembly can be constructed such that frame 50 is permanently sealed to housing 12 (FIGS. 1 and 2) or attachably sealed to housing 12 as illustrated in FIG. 3 where frame 50 is provided with threads 50A that engage internal threads 16 of housing 12. In either construction, o-ring seals 54 and 56 (FIG. 3 only) or other sealing mechanisms can be used where frame 50 engages portions of housing 12. Further, regardless of the construction of the filter assembly, frame 50 has (i) pores or openings 58 formed therethrough in opposition to opening 14, and (ii) a hole 50B formed therethrough that combines with tubular section 24 to define an unobstructed passage from opening 18 through the filter assembly.

As mentioned above, the filter assembly in combination with housing 12 and cap 30 define two distinct chambers within housing 12. Specifically, a first chamber 40 is defined on one side of the filter assembly and a second chamber 42 is defined on the other side of the filter assembly. In the illustrated embodiment, first chamber 40 is an annular chamber formed about tubular section 24. Access to first chamber 40 is only available via opening 20. Second chamber 42 is sealed by cap 30 (FIG. 2) and is accessible only via opening 18.

Cap 30 has external threads 32 formed thereon for engagement with internal threads 16 of housing 12. An o-ring seal 33 can be used to insure a fluid-tight seal with housing 12. Cap 30 can be recessed at 34 to define a region that falls within the confines of housing 12 when cap 30 is attached thereto. Mounted in recess 34 is an attachment system 36 that facilitates attachment of system 10 to a user's backpack, belt, clothing, or other disparate device. Attachment system 36 could be constructed in a variety of ways without departing from the scope of the present invention. For example, attachment system 36 could be realized by providing two spaced-apart strap loops 36A that can be made integrally with cap 30 for strength. A strap 36B engaging strap loops 36A can be used to attach system 10 to a disparate device, article of clothing, etc. Strap 36B will typically include a closure mechanism (not shown) such as snaps, buckles, VELCRO, etc., the choice of which is not a limitation of the present invention.

Figure 4:
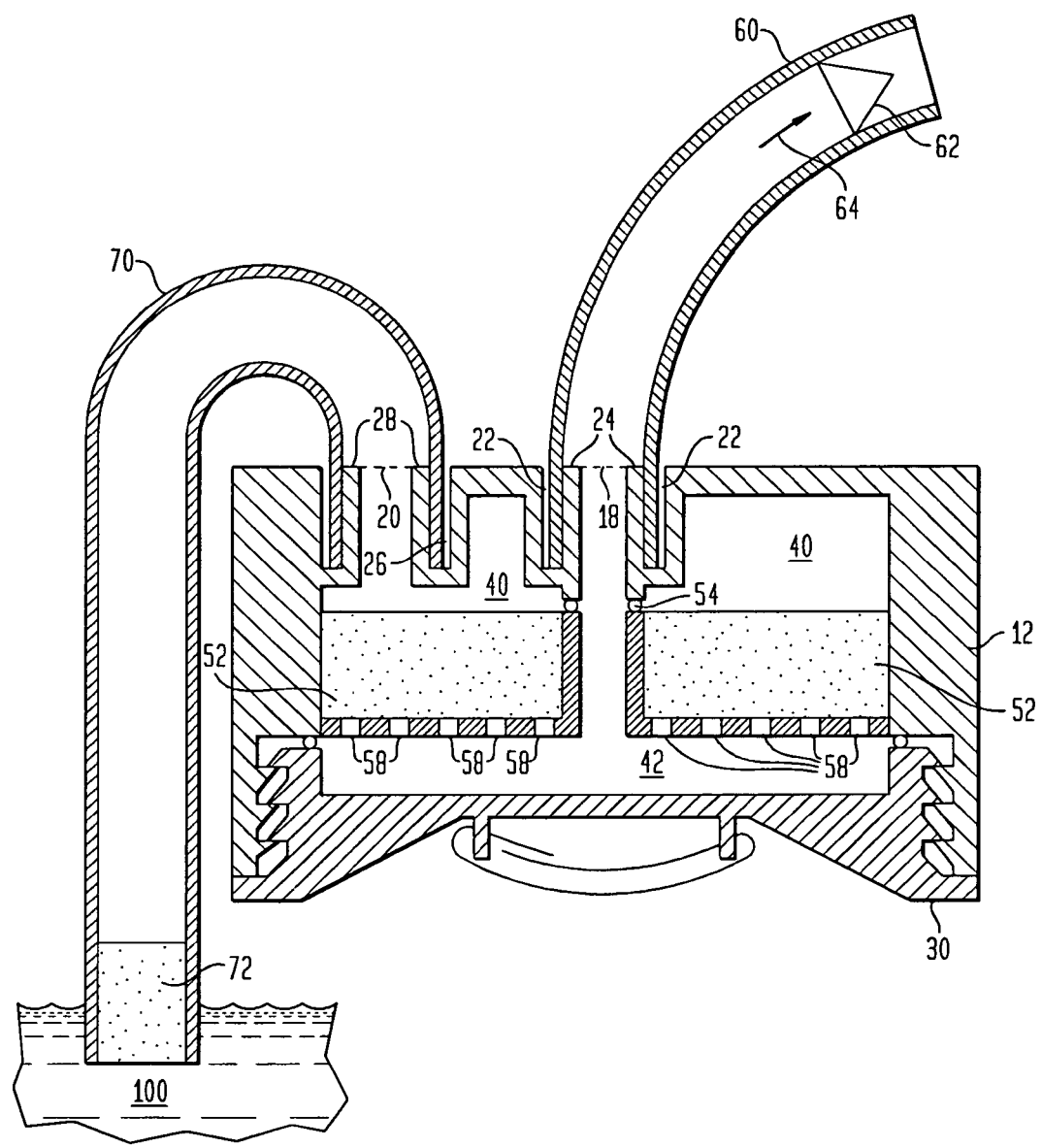
FIG. 4 is a cross-sectional view of another embodiment of the fluid filtration system to include an input fluid tube and a suction tube.

Two different uses of fluid filtration system 10 will now be explained with the aid of FIGS. 4 and 5. In FIG. 4, the fluid filtration system further includes two flexible tubes 60 and 70. Tube 60 is a suction tube fitted into annular recess 22. Tube 60 is sized such that it will sealingly engage tubular section 24. A one-way check valve 62 can be incorporated into tube 60 (or in tubular section 24 or hole 50B) to only permit fluid movement therethrough in the direction of arrow 64. Tube 70 is an input tube fitted into annular recess 26. Tube 70 is sized such that it will sealingly engage tubular section 28. A coarse particle filter 72 can be provided/fitted into tube 70.

In use, when the free end of tube 70 is placed in an unpotable and/or distasteful fluid (e.g., water) supply 100, a user sucks on the free end of tube 60. The suction force opens check valve 62 and draws fluid from supply 100 through tube 70, into first chamber 40, through filter material 52/openings 58, into second chamber 42, and then out opening 18 and into tube 60. In this way, the unpotable fluid is made drinkable on demand. Since only filtered fluid can come into contact with chamber 42 and tube 60, these portions of system 10 will always be free of contaminants. Further, there are no moving parts to corrode and/or fail thereby assuring the robustness of system 10 even in harsh environments.

Figure 5:
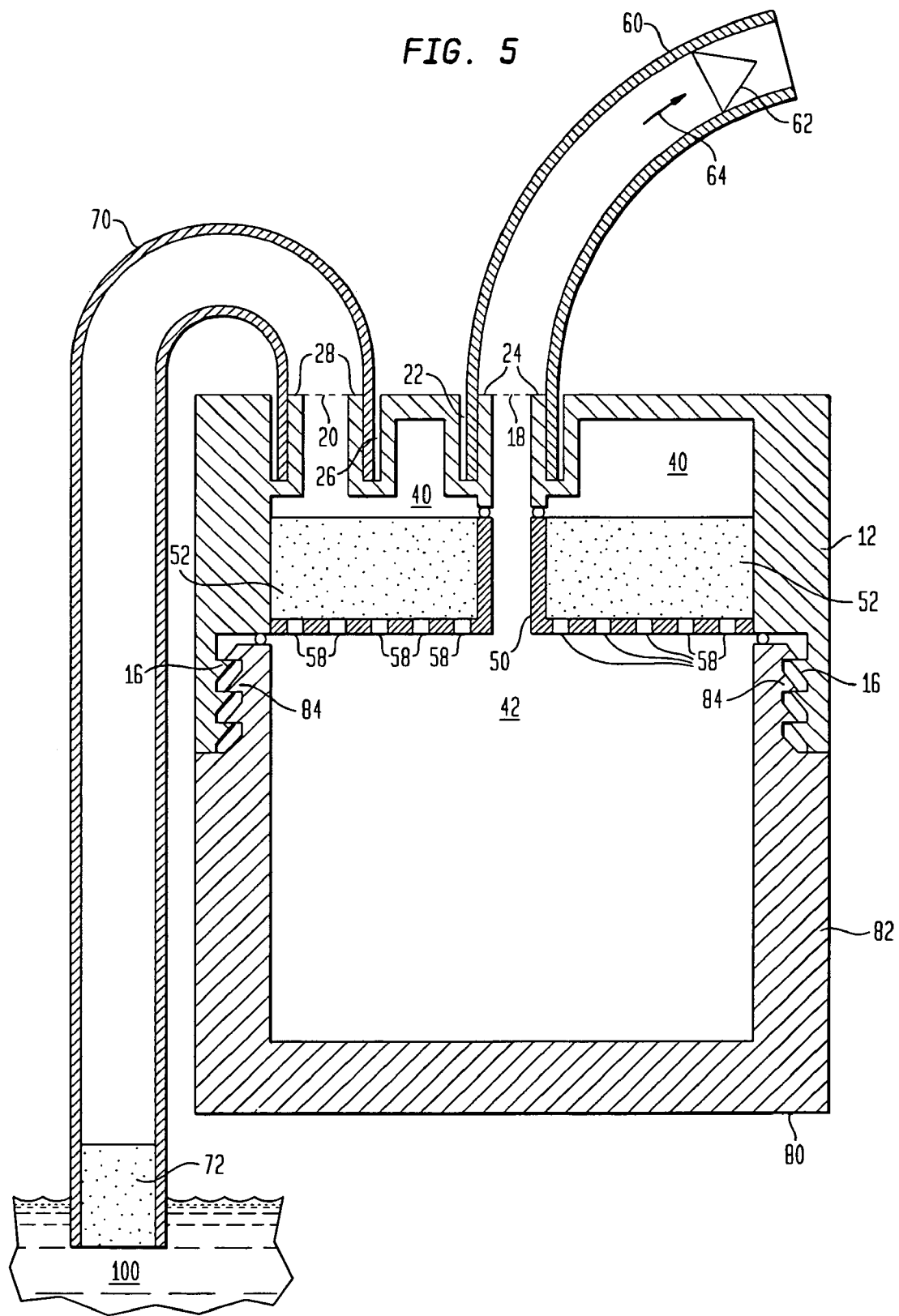
FIG. 5 is a cross-sectional view another embodiment of the fluid filtration system to include a container as well as an input fluid tube and a suction tube used to fill the container with filtered fluid.

In FIG. 5, the fluid filtration system is further adapted to provide the user with a reservoir of filtered fluid for later use. More specifically, the system in FIG. 5 replaces cap 30 with a cap 80 that also incorporates a container body 82 (e.g., a conventional water bottle). Accordingly, cap 80 is provided with threads 84 that engage internal threads 16 of housing 12. Fluid from unpotable and/or distasteful supply 100 is passed through filter material 52/openings 58 (in the same way just described) to fill container body 82. Once container body 82 is filled, tube 70 can be removed and opening 20 can be capped with a fitted cap (not shown) or by using one's finger so that suction applied to the free end of tube 60 acts to draw filtered fluid from container body 82.

The advantages of the present invention are numerous. The fluid filtration system is readily adaptable for use in a wide variety of recreational sports or emergency conditions. In its most compact form (FIGS. 2 and 4), the system can be used to provide drinkable water on demand without the need to carry a container of drinkable fluid. Thus, the present invention reduces the bulk and weight generally associated with fluid-holding containers. Further, the compact nature of the system makes it readily packed as a piece of emergency equipment.

Figure 6:
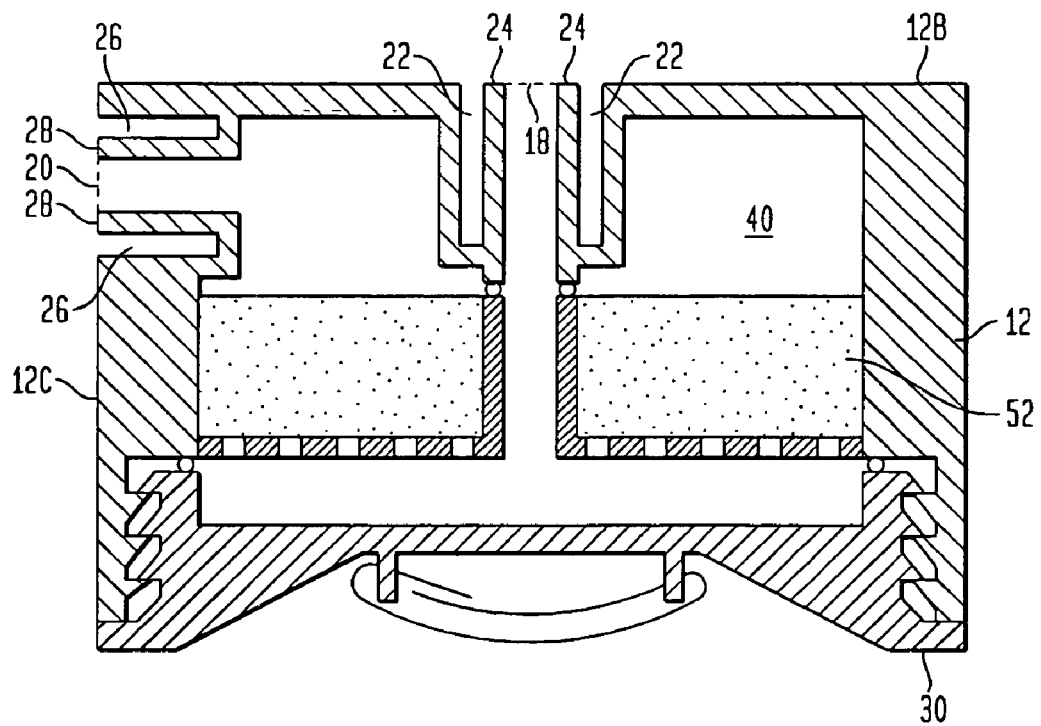
FIG. 6 is a cross-sectional view of yet another embodiment of the fluid filtration system in which the input fluid opening and suction opening are on different sides of the system's housing.

Although the invention has been described relative to a specific embodiment thereof, there are numerous variations and modifications that will be readily apparent to those skilled in the art in light of the above teachings. For example, FIG. 6 illustrates another embodiment of the present invention in which opening 20/recess 26/tubular section 28 are positioned in sidewall 12C of housing 12. This could be done to provide a user with a clear delineation between the input side and suction side of the fluid filtration system. Additionally or alternatively, such delineation could be achieved by color-matching tubular section 24 to tube 60 and tubular section 28 to tube 70. It is therefore to be understood that, within the scope of the appended claims, the invention may be practiced other than as specifically described.

What is claimed as new and desired to be secured by Letters Patent of the United States is:

1. A fluid filtration system, comprising:
   a housing having first, second and third openings formed therein;
   a cap removably and sealably attached to said first opening;
   a first tube sealably coupled to said second opening, said first tube extending to a free end thereof;
   a second tube sealably coupled to said third opening, said second tube extending to a free end thereof;
   a one-way check valve fitted in said first tube, said check valve prohibiting movement of fluent material therethrough towards said second opening; and
   a filter assembly fitted in said housing and, in combination with said housing, defines a first chamber accessible via said third opening and a second chamber accessible via said second opening and sealed by said cap wherein, when a fluid to be filtered is present at said free end of said second tube and suction is applied to said second opening via said free end of said first tube, fluid is (i) drawn into said first chamber, (ii) through said filter assembly, (iii) into said second chamber, and (iv) to said second opening.

2. A fluid filtration system as in claim 1 wherein said second opening and said third opening are on different sides of said housing.

3. A fluid filtration as in claim 1 wherein said second opening is accessible to said second chamber via a passageway formed through said filter assembly.

4. A fluid filtration system as in claim 1 further comprising a filter fitted in said second tube.

5. A fluid filtration system as in claim 1 wherein said housing defines an annular recess around each of said second opening and said third opening.

6. A fluid filtration system as in claim 1 wherein said housing at said first opening is adapted to be coupled to a container.

7. A fluid filtration system as in claim 1 wherein said cap comprises a container.

8. A fluid filtration system, comprising:
  a cylindrical housing having first and second axial ends and a cylindrical side wall, said cylindrical housing having (i) a first opening formed through said first axial end, (ii) a second opening formed through said second axial end, and (iii) a third opening formed through one of said second axial end and said cylindrical side wall;
  a cap removably and sealably attached to said first opening;
  a first tube sealably coupled to said second opening, said first tube extending to a free end thereof;
  a second tube sealably coupled to said third opening, said second tube extending to said free end thereof;
  a one-way check valve fitted in said first tube, said check valve prohibiting movement of fluent material therethrough towards said second opening; and
  a filter assembly fitted within said cylindrical housing and, in combination with said cylindrical housing, defines a first chamber accessible via said third opening and a second chamber accessible via said second opening and sealed by said cap wherein, when a fluid to be filtered is present at said free end of said second tube and suction is applied to said second opening via said free end of said first tube, the fluid is (i) drawn into said first chamber, (ii) through said filter assembly, (iii) into said second chamber, and (iv) to said second opening.

9. A fluid filtration system as in claim 8 wherein said second opening is accessible to said second chamber via a passageway formed through said filter assembly.

10. A fluid filtration system as in claim 8 wherein said cap has a recessed portion that lies within the confines of said cylindrical housing, said system further comprising attachment means coupled to said cap in said recessed portion thereof, and adapted to be attached to a disparate device.

11. A fluid filtration system as in claim 8 further comprising a filter fitted in said second tube.

12. A fluid filtration system as in claim 8 wherein said housing defines an annular recess around each of said second opening and said third opening.

13. A fluid filtration system as in claim 8 wherein said housing at said first opening is adapted to be coupled to a container.

14. A fluid filtration system as in claim 8 wherein said cap comprises a container.

15. A fluid filtration system, comprising:
  a cylindrical housing having first and second axial ends, said first axial end defining a first opening that spans an internal diameter of said cylindrical housing, and said second axial end having second and third openings formed therein with an annular recess being formed in said second axial end around each of said second opening and said third opening;
  a cap in threaded engagement with said cylindrical housing to seal said first opening;
  a first tube having one end thereof inserted into said annular recess formed around said second opening for forming a sealing engagement therewith, said first tube having a second end that is free;
  a second tube having one end thereof inserted into said annular recess formed around said third opening for forming a sealing engagement therewith, said second tube having a second end that is free;
  a one-way check valve fitted in said first tube, said check valve prohibiting movement of fluent material therethrough towards said second opening; and
  a filter assembly fitted within said cylindrical housing and, in combination with said cylindrical housing, defines a first chamber accessible via said third opening and a second chamber accessible via said second opening and sealed by said cap, said filter assembly having an unobstructed passageway formed therethrough that coupled said second opening to said second chamber wherein, when a fluid to be filtered is present said second end of said second tube and suction is applied to said second opening via said second end of said first tube, the fluid is (i) drawn into said first chamber, (ii) through said filter assembly, (iii) into said second chamber, and (iv) to said second opening via said unobstructed passageway.

16. A fluid filtration system as in claim 15 wherein said cap has a recessed portion that lies within the confines of said cylindrical housing, said system further comprising attachment means coupled to said cap in said recessed portion thereof, and adapted to be attached to a disparate device.

17. A fluid filtration system as in claim 15 further comprising a filter fitted in said second tube.

18. A fluid filtration system as in claim 15 wherein said housing at said first opening is adapted to be coupled to a container.

19. A fluid filtration system as in claim 15 wherein said cap comprises a container.

* * * * *